United States Patent [19]

Elliott et al.

[11] Patent Number: 4,533,280

[45] Date of Patent: Aug. 6, 1985

[54] SURFACE REMOVAL SILO UNLOADERS

[75] Inventors: Thomas Elliott, R.D. #5, Box 298, Towanda, Pa. 18848; Todd Knecht, Towanda, Pa.

[73] Assignee: Thomas Elliott, Towanda, Pa.

[21] Appl. No.: 498,305

[22] Filed: May 26, 1983

[51] Int. Cl.³ ............... B65G 53/48; B65G 65/38; A01F 25/20

[52] U.S. Cl. ................... 406/57; 406/107; 406/114; 414/313

[58] Field of Search ............... 406/57–59, 406/80, 97, 107, 114; 414/292, 313–322

[56] References Cited

U.S. PATENT DOCUMENTS 3,612,617 10/1971 Scherz ............... 406/80

FOREIGN PATENT DOCUMENTS 920039 3/1963 United Kingdom ............... 406/107

Primary Examiner—Jeffrey V. Nase
Attorney, Agent, or Firm—Barnard & Brown

[57] ABSTRACT

An improved silo unloader having an ensilage cover of air impermeable thermally insulating material for limiting air contact with the surface of the ensilage. The ensilage cover rests on the surface of the ensilage and rotates with the lower part of the silo unloader. The ensilage cover is preferably constructed of upper and lower layers of air-impermeable material with an insulating material layer between. The lower layer is preferably coated with a material which is resistant to adherence of frozen material.

3 Claims, 4 Drawing Figures

SURFACE REMOVAL SILO UNLOADERS

BACKGROUND OF THE INVENTION

1. Field of the Invention

The invention pertains to devices and methods of storing and removing matter in silos.

More specifically the invention pertains to devices for unloading upright silos by removing the material from the surface of the mass of ensilage. An upright silo comprises a hollow vertical cylindrical shaped structure. It may be constructed of concrete, wood, or other material. Silos are utilized for storage of organic material which is then retrieved when desired and used as feed for livestock. This material will herein be referred to as "ensilage".

2. Description of the Prior Art

The most common method of retrieval is through the use of a "silo unloader". This contains a "gathering mechanism" which is rotated around the silo, in contact with the surface of the ensilage, loosening the packed material and conveying it to a central removal mechanism, which discharges the ensilage from the silo, usually through doors set in a vertical row down the side of the silo. This is an effective means of retrieving ensilage. However, the continually exposed surface of the material presents a number of problems.

Air contact with the surface of the ensilage causes spoilage and dehydration of the material. Extreme cold can result in the freezing of the surface of the ensilage, which can cause sickness in livestock eating the silage. Impurities, such as bird droppings, can contaminate the ensilage. Tools, or other items, if dropped in the silo, can easily be lost in the ensilage, causing damage to the silo unloader. There are also safety problems inherent in current unloaders, in that farmers sometimes become entangled in the gathering mechanism while observing the machine in operation, causing loss of life or limb.

In order to minimize the problems associated with surface exposure, farmers often erect a number of silos of relatively small diameter (hence smaller surface area), removing ensilage from only a portion of the silos at a given time. A lesser number of silos with larger diameter would suffice if surface loss problems could be controlled.

It is thus an object of the invention to provide a silo unloader which reduces the spoiling and dehydration of the ensilage due to exposure to air at the surface.

Another object of the invention is to provide a silo unloader which reduces likelihood of impurities contaminating the surface of the ensilage.

It is the further object of the invention to provide a silo unloader which allows farmers to efficiently utilize silos of wider diameters by minimizing the surface losses inherent in the greater surface area of larger silos.

It is a still further object of the invention to provide a silo unloader which reduces the probability of the loss of tools or other items in the ensilage.

It is an additional object of the invention to provide a silo unloader which minimizes hazards from exposed mechanisms.

SUMMARY OF THE INVENTION

The invention presents an improved silo unloader having an ensilage cover as a part of the machine. The cover rotates with the unloader, resting on the surface of the ensilage. The gathering mechanism and the central mechanism of removal are sealed when the unloader is not in operation, to protect the ensilage surface from contact with the air in the silo above the unloader. The weight and rotation of the cover compresses the material that is loosened by the action of the gathering mechanism, forcing out air. Thus, air exposure with the surface of the ensilage is reduced, reducing spoiling and dehydration of the silage. The cover insulates the surface of the material against freezing. The ensilage is shielded by the cover, reducing the amount of impurities that can cause contamination. The invention, by reducing surface exposure problems, allows farmers to utilize silos of a wider diameter, without suffering deterioration of ensilage quality. The probability of losing tools or other items in the ensilage is reduced by the shielding action of the invention. The invention shields the gathering mechanism more throughly than in the prior art, thus reducing the possibility of injuries.

DESCRIPTION OF THE PREFERRED EMBODIMENT

The invention represents an improvement to a conventional surface removal silo unloader, of the type currently marketed by Jamesway, Patz, Starline and others. The operation of such a machine is described in the following paragraphs.

Figure 1:
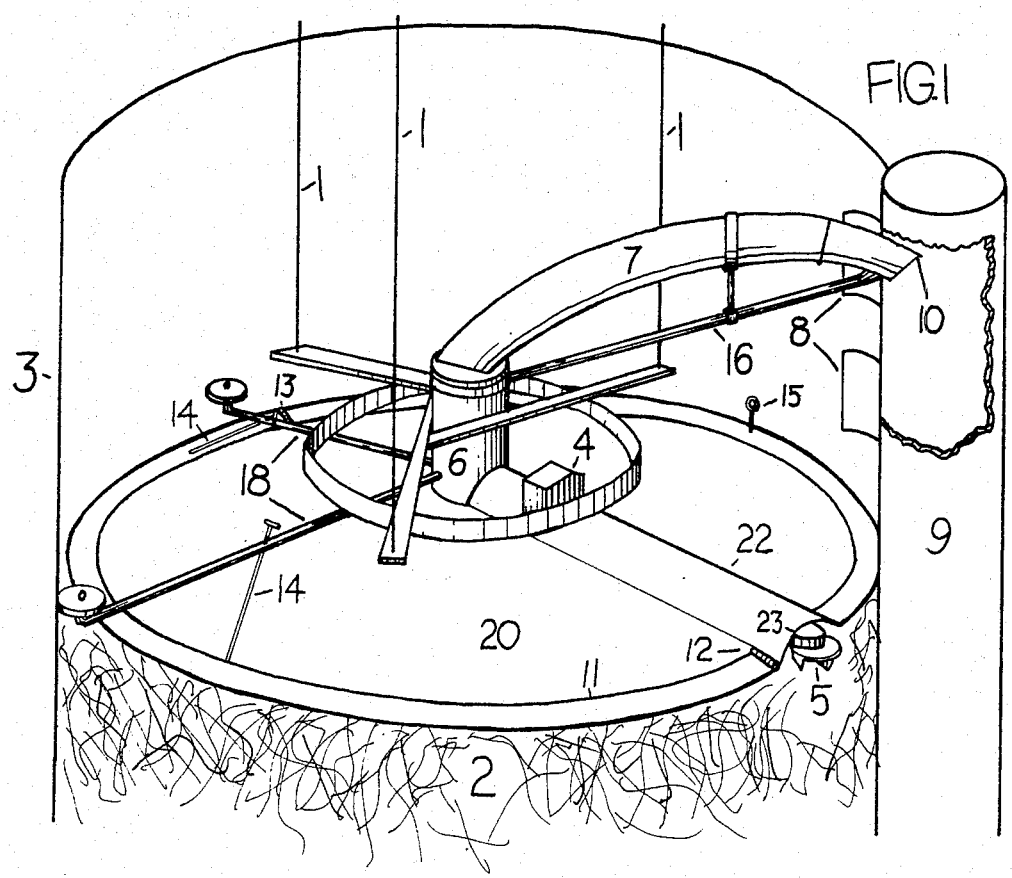
FIG. 1 shows a view of the invention in operation, showing the path of the ensilage through the unloader.

Most commonly (FIG. 1) the frame of the machine is suspended by one or more cables(s) (1), although it may rest entirely upon the surface of the mass of ensilage (2) in the silo (3). The unloader is usually powered by one or more electric motors (4). During operation, a rotating portion fastened under the frame having a gathering mechanism (here shown as an auger) (5) extending from the center of the unloader to the wall or the silo, is continually rotated around the circumference of the silo, loosening a layer of material on the surface of the ensilage, and conveying it to a central mechanism for removal (6). The removal mechanism is most often an impeller, comprising a number of paddles attached to a rotating shaft. The impeller ejects the ensilage through a chute (7) to an opening (8), one of a vertical row of doors in the side of the silo, and into a silo chute (9) enclosing the vertical row of doors in the side of the silo. The ensilage then falls, by gravity, to a point where it can be further handled.

A stabilizing arm (16) may be extended from the unloader and attached to the sill of the door. The arm must periodically be lowered to the sill of another door as the ensilage is removed. A number of additional arms (18), having wheels riding in contact with the silo, may also be employed to keep the unloader properly centered in the silo.

The invention comprises the addition of an ensilage cover (20) to the silo unloader. The cover rests on the surface of the ensilage, rotating with the rotating portion of the unloader. The invention may optionally add a number of other improvements in the state-of-the-art silo unloader to more efficiently utilize the cover. The gathering mechanism is enclosed in a shield (22). The shield is preferably constructed of an insulating, air impenetrable material, such as wood, or combination of materials, such as steel covered by an insulating material. The shield is positioned as close as possible to the gathering mechanism without interfering with its action, so as to trap the least possible amount of air within the shield.

The end of the shield (23) adjacent to the silo wall preferably has a seal constructed of a flexible material, such as rubber, in contact with the silo wall. The shield seals at the other end to the impeller housing to complete (with the impeller closing described below) the enclosure of the gathering mechanism in a relatively air-tight shield.

Figure 4:
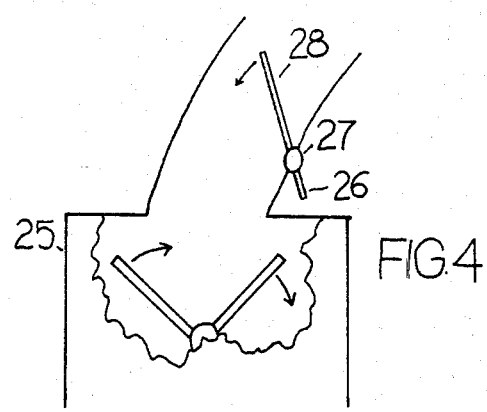
FIG. 4 shows a detail of the impeller closure.

Referring to FIG. 4, the opening in the top of the impeller housing (25) which allows ensilage to exit is sealed when the unloader is not in use, to restrict air movement. This is accomplished by employing a nearly balanced shutter (26) which swings freely on a shaft (27). The shutter contains a greater amount of weight on the end (28) nearest the impeller opening, thus urging the shutter to swing over the impeller opening similar to the air-tight dampers used in furnace pipes. When the unloader is in use, the force of air and ensilage being ejected by the impeller forces the shutter open, allowing ensilage to be ejected. When the unloader ceases operation, the imperfect balancing of the shutter causes it to settle over the impeller opening.

A portion of the ensilage which is ejected from the silo may impact the silo chute (9) and fall back into the silo instead of down the chute, collecting on the cover. This is prevented by extending the spout (10) of the silo unloader out of the door of the silo, and positioning it so that the ensilage is directed in a downward direction, such that it does not strike the silo chute until it is no longer able to re-enter the chute door.

A portion of the ensilage may also collect on the cover at times when the impeller is not at speed, i.e. during starting or ceasing operation. This can be minimized by an overrunning clutch on the impeller shaft. When the unloader ceases operation this allows the impeller to turn freely by flywheel effect, allowing it to eject the material that is in the impeller chamber through the silo door. When the unloader is put into operation the chamber is clear of material that would fall short of the silo door due to insufficient impeller speed.

A tray may be attached along the length of the stabilizing arm, extending into the silo door. This captures any ensilage that falls short of the door and would collect on the cover. The tray may be emptied periodically when adjusting or maintaining the unloader.

Figure 3:
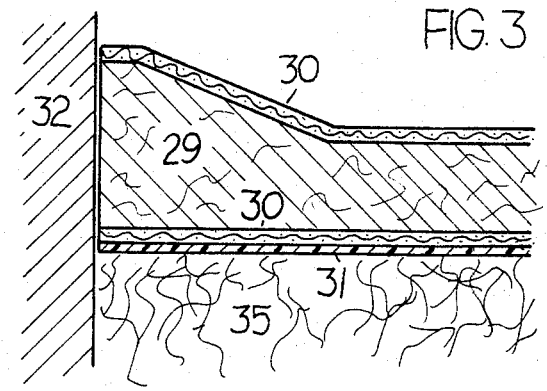
FIG. 3 shows a cut-away detail of the silage cover.

Referring to FIG. 3, the ensilage cover is preferably constructed of a layer of flexible, insulating material, such as fiberglass wool or batting of the type used in house insulation (29). This rests between layers of an air-tight, flexible material such as rubberized canvas (30). The insulating layer will vary in thickness depending on the severity of the climate of the area in which it is to be used. A two inch thick layer should be adequate for the northern Pennsylvania area, with possibly a greater thickness in New England, less in Virginia, for example. The layers are bonded together so as to form a combination that is impermeable to air. The portion of the cover that is in contact with the surface of the ensilage (35) is preferably coated with, or constructed of a material, that is resistant to being adhered to by frozen material (31). Polyvinyl Chloride (PVC), or the like, would be an appropriate material for this application.

The cover preferably has a greater amount of insulating material in the area adjacent to the silo wall (32) than in the center to counter the increased threat of frosting due to cold penetrating the silo wall. The cover also preferably has a greater amount of weight in the area that is adjacent to the silo wall to reduce air penetration around the perimeter of the cover. Both of these aims may be accomplished by having a greater thickness of the insulating layer at the perimeter of the cover than in the center. The multi layer design described is the preferred embodiment, but it will be understood that the cover could be constructed of any material, or combination of materials, which is impermeable to air and of sufficient strength to withstand the forces involved in resting upon and rotating over the ensilage.

A rigid or semi-rigid cover could be used, but some means of disassembly would then be required, in order that the cover be capable of entry into the silo through the relatively small openings provided. A flexible cover is preferred for ease of installation and use. This necessitates a means of supporting the cover around the perimeter of the silo, which is acheived by attaching the cover to a "support ring" (11). The support ring is located a short distance from the silo wall, with the cover extending as close as possible to the wall. The support ring is made of a rigid material, such as a light metal, and is preferably assembled from a number of curved sections, for ease of use.

The cover is sealed to the rotating portion of the unloader along the impeller housing, along the length of either side of the gathering mechanism, and to the support ring using fasteners such as carriage bolts.

Figure 2:
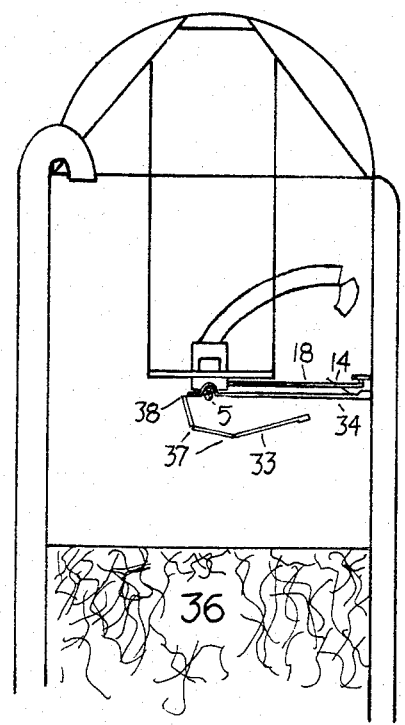
FIG. 2 shows the invention as positioned during filling the silo.

The ring is preferably made in two parts. The first half-circle is attached to the gathering mechanism housing at one end (12) and to the stabilizer arms (18) at the other end (13) and in the middle (14). The second half is hinged at one end to the gathering mechanism housing (38) and at the other to the first half ring attach point on the stabizing arm (18). For loading the silo, (FIG. 2) the unloader is raised from the ensilage surface (36), and the second half of the cover (33) is folded under the first (34). The ring sections in the second half ring are preferably hinged (37) to each other to allow the half ring to fold. This permits extension of the cover back to its operational position, even if there is insufficient clearance between the unloader and the ensilage surface to permit the full radius of the cover to swing past.

Accordingly, it is to be understood that the embodiments of the invention herein described are merely illustrative of the application of the principles of the invention. Reference herein to details of the illustrated embodiments are not intended to limit the scope of the claims which themselves recite those features regarded as essential to the invention.

We claim:

1. In a surface removal silo unloader, located within a silo for storing ensilage, the silo being of cylindrical form having a longitudinal axis and walls of circular cross-section forming the longitudinal axis, the unloader being located above the surface of the ensilage stored therein for unloading of the ensilage through doors located in the side of the silo; the unloader being of the type having a fixed portion comprising a stationary frame adapted for vertical movement along the longitudinal axis of the silo; means for supporting the frame above the surface of the ensilage; impeller means for forceably removing ensilage from under the center of the unloader, mounted on the frame means at the center thereof; chute means for guiding the ensilage removed by the impeller means to the doors in the side of the silo; and having a rotation portion comprising: gathering means for conveying ensilage from the periphery of the silo to the impeller means, mounted beneath the frame means with at least part adapted to contact the ensilage and draw it toward the impeller means, the entire gathering means being adapted for rotational movement around the longitudinal axis of the silo; the improvement comprising:

a. an ensilage cover constructed of air-impermeable thermally insulating material for limiting air contact with the surface of the ensilage, covering substantially all of the surface of the ensilage, and attached to the rotating portion of the unloader for movement therewith; comprising:
  1. first cover means closely surrounding the part of the gathering means which is not in contact with the ensilage;
  2. second cover means sealably mating with the first cover means, and comprising a circular planar sheet resting upon the surface of the ensilage, having a slot along a radius of the circle wide enough to accomodate the gathering means and first cover means;

b. the thermally insulating air impermeable material o the ensilage cover comprising a layer of insulating material between upper and lower air-impermeable layers; the air impermeable layers being plastic-coated canvas; and at least the lower air-impermeable layer being further coated with a bottom layer of material which is resistant to being adhered to by frozen ensilage;

c. the ensilage cover having an opening therein to allow unloading of ensilage through the cover;

d. seal means for limiting air flow between the cover and the circumference of the silo wall.

2. The improved silo unloader of claim 1 in which the bottom layer of material which is resistant to being adhered to by frozen ensilage is polyvinyl chloride (PVC).

3. The improved silo unloader of claim 1 in which the insulating layer is thicker in the portion nearer the walls of the silo than in the center.

* * * * *